(12) United States Patent
Osman

(10) Patent No.: US 6,801,523 B1
(45) Date of Patent: *Oct. 5, 2004

(54) METHOD AND APPARATUS FOR PERFORMING INTERNET PROTOCOL ADDRESS RESOLUTIONS IN A TELECOMMUNICATIONS NETWORK

(75) Inventor: Ghassan M. Osman, Stittsville (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,967

(22) Filed: Jul. 1, 1999

(51) Int. Cl.$^7$ ................................................ H04L 12/66
(52) U.S. Cl. ..................... 370/352; 370/389; 370/395.2; 370/395.54; 370/401; 370/493
(58) Field of Search ................................. 370/255, 353, 370/354, 355, 356, 401, 493, 496; 379/112.01, 112.09, 142.07, 207.14, 207.15, 224, 258, 352, 389, 395.2, 395.5, 395.54, 475

(56) References Cited

U.S. PATENT DOCUMENTS

| | | | | |
|---|---|---|---|---|
| 5,917,901 A | * | 6/1999 | Maxwell et al. | 379/229 |
| 6,144,671 A | * | 11/2000 | Perinpanathan et al. | 370/409 |
| 6,185,184 B1 | * | 2/2001 | Mattaway et al. | 370/230 |
| 6,324,279 B1 | * | 11/2001 | Kalmanek, Jr. et al. | 379/229 |
| 6,324,280 B2 | * | 11/2001 | Dunn et al. | 379/230 |
| 6,339,593 B1 | * | 1/2002 | Kikinis | 370/352 |
| 6,347,085 B2 | * | 2/2002 | Kelly | 370/352 |
| 6,373,857 B1 | * | 4/2002 | Ma | 370/475 |
| 6,377,568 B1 | * | 4/2002 | Kelly | 370/352 |
| 6,404,764 B1 | * | 6/2002 | Jones et al. | 370/352 |
| 6,584,094 B2 | * | 6/2003 | Maroulis et al. | 370/352 |
| 2003/0095542 A1 | * | 5/2003 | Chang et al. | 370/352 |

FOREIGN PATENT DOCUMENTS

| | | | |
|---|---|---|---|
| EP | 0 769 882 A1 | * 4/1997 | |
| EP | 0907280 | 1/1998 | ............ H04M/7/00 |
| WO | 0046964 | 1/2000 | ............ H04L/12/66 |

OTHER PUBLICATIONS

Donaldson et al., "Hybrid Networking for Business Applications". Telecommunications, 1991. Third IEEE Conference on Mar. 17–20, 1991, pp. 112–117.*

Jonathan Rosenberg, et al., "Internet Telephony Gateway Location", published by Columbia University.

* cited by examiner

*Primary Examiner*—Chi Pham
*Assistant Examiner*—Anh Vu H Ly (57) ABSTRACT

A method and apparatus for performing directory number/Internet Protocol (IP) address resolutions to facilitate voice over IP communications. A message requesting the IP address of an IP gateway is built at an originating Time-Division Multiplex (TDM) switch (that forms part of either a private or public network). The message is forwarded over a TDM telecommunications network to a terminating TDM switch, where the requested IP address information is retrieved. The IP address is forwarded across the TDM telecommunications network to the originating TDM switch. The IP address is then used to establish a call across an IP network. By using existing TDM protocols and infrastructure to request and retrieve IP gateway information, the present invention does not suffer from the scalability problems inherent in other DN/IP address resolution solutions.

26 Claims, 4 Drawing Sheets

METHOD AND APPARATUS FOR PERFORMING INTERNET PROTOCOL ADDRESS RESOLUTIONS IN A TELECOMMUNICATIONS NETWORK

FIELD OF THE INVENTION

The present invention relates generally to telecommunications networks, and more particularly to a method and apparatus for performing directory number/Internet Protocol (IP) address resolutions to facilitate voice over IP communications.

BACKGROUND OF THE INVENTION

Though originally designed for the transmission of data, Internet Protocol (IP) networks are increasingly being used as an alternative voice communication tool. In recent years there have been many advancements and developments in the area of IP telephony, which refers to communication services e.g. voice, facsimile, and/or voice-messaging applications that are transported via an Internet Protocol network, rather than the Public Switched Telephone Network (PSTN). Telephone subscribers are drawn to IP telephony as an alternative to traditional forms of communications, especially for long-distance telephone calls, because it can offer cost savings relative to the PSTN. With the use of IP telephony, subscribers can bypass long-distance carriers and their per-minute usage rates and run their voice traffic over an IP network, such as the Internet, for a flat monthly Internet access fee.

Presently, a PSTN caller cannot place a voice call over an IP network to another PSTN phone or terminal by simply dialling the called directory number. This is because the PSTN is not set up to map a directory number to an IP address, which is necessary for PSTN-IP network interaction.

In today's IP networks, an IP gateway provides the necessary connectivity between an IP network and the PSTN. Typically, a long distance call initiated by a PSTN caller to a PSTN called party over an IP network would involve the following steps: (i) a PSTN call to a local IP gateway; (ii) an IP call to a far-end IP gateway; and (iii) a PSTN call from the far-end IP gateway to the called party. The function of the IP gateway is to perform the necessary translations of addressing and routing information between the IP network and the PSTN and vice versa for the call to reach its intended destination.

To reduce costs, it is often desirable to select a far-end IP gateway that would result in the cheapest call from the gateway to the called party. Other criteria, such as reliability and quality may also be used to select one far-end IP gateway over another. However, IP gateways may be scattered around the world, run by possibly independent, widely distributed service providers. The problem is that given a directory number for a called party, how does the network know which far-end IP gateway meets the criteria set by the calling party for the call?

Several solutions have been put forward to provide directory number/IP address resolution for IP gateways. For example, centralized databases connected to the IP network can be queried to provide the necessary mappings between directory numbers to IP addresses. An example of the implementation of a centralized database approach is set out in Jonathan Rosenberg and Henning Schulzrinne, "Internet Telephony Gateway Location" Bell Laboratories, Columbia University, 1998. However, a centralized database approach is not viable in the context of most large IP networks, such as the Internet. First, a failure in the database could be catastrophic to the network. Second, it can be an unmanageable process to maintain records in one centralized database for all IP gateways scattered around the world.

Global solutions with distributed telephone number hierarchy for information retrieval have also been put forward. These solutions require Trusted, Third Party, Top Level Service Providers. These entities are known as an Internet Telephony Directory Service Providers (ITDSPs). However, there is presently no common infrastructure in place to implement these solutions with relative speed.

Distributed database solutions, which scatter information concerning IP gateways across the IP network, have also been considered. However, the forms of distributed databases that have been proposed all suffer from similar scalability problems due to the difficulty of organizing and searching through the distributed data entries.

SUMMARY OF THE INVENTION

Since it is likely that the current PSTN will remain the dominant medium of carrying telephony services for quite some time, the present invention solves the problem of directory number/IP address resolution by treating an IP gateway as an extension of the PSTN rather than solely as an IP based entity.

The present invention takes advantage of existing TDM protocols and infrastructure to request and retrieve IP gateway information without the need for special hardware or third-party services. By using existing TDM infrastructure to resolve DN/IP address queries, the present invention does not suffer from the scalability problems inherent in other DN/IP address resolution solutions.

The steps of a typical implementation of the present invention include: (i) the user initiating a call from a regular telephone by dialling a directory number (DN) of a called party but requesting an IP-based network route; (ii) upon call initiation, an originating Time-Division Multiplex (TDM) switch servicing the user forwards a message over a TDM network requesting the IP address of an IP gateway servicing the called party (the far-end IP gateway), (iii) the terminating TDM switch servicing the called party retrieves IP address of the far-end IP gateway corresponding to the DN, and forwards that IP address to the originating TDM switch over the TDM network; (iv) the originating exchange switch receives the IP address of the far-end IP gateway and forwards the IP address to a near-end IP gateway; (v) using the IP address, the near-end IP gateway establishes a speech path over an IP-based network that terminates at the far-end gateway; (vi) far-end IP gateway receives call and completes it to the DN.

IP gateway information can be retrieved to enable IP calls to be made between two end nodes of a private network, two end nodes of a public network, or any combination of end nodes in a public and a private network.

In one embodiment of the present invention, the QSIG and QVPN (QSIG Virtual Private Network) signalling protocols are used to request and retrieve IP gateway information across a TDM network between an originating TDM switch, a terminating TDM switch, and any necessary TDM transit switches between the end switches. QSIG is a signalling system protocol used between interconnected Private Integrated Services Network Exchanges in a Private Integrated Services Network. QVPN is used to implement the service of the present invention between public TDM switches.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
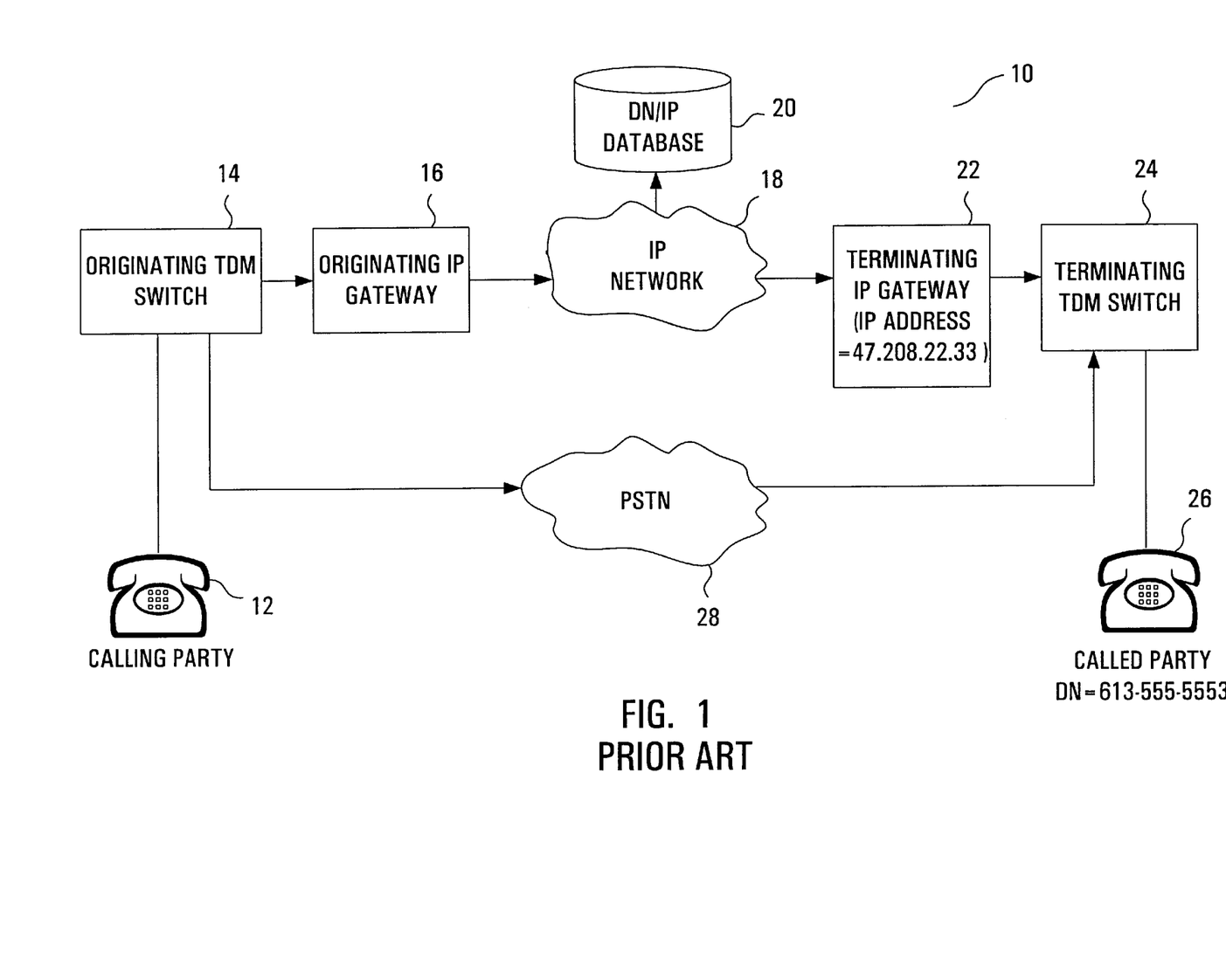
FIG. 1 is a block diagram of a prior art network used to establish voice over IP telecommunications.

FIG. 1 is a block diagram of a prior art network 10 used to establish voice over IP telecommunications. In the network 10 illustrated in FIG. 1, a calling party 12 is connected to an originating TDM switch 14 which is connected to both an originating IP gateway 16 and the PSTN 28. PSTN 28 is connected to a terminating TDM switch 24, which is connected to a called party 26 and to a terminating IP gateway 22. Both gateways 16 and 22 are connected to an IP network 18. The route for a normal PSTN call would be from called party 12 to originating TDM switch 14, to PSTN 28, to terminating TDM switch 24, to called party 26. Usually, this route would result in the highest long distance charge. Note that originating TDM switch 14 and terminating TDM switch 24 may either be public exchanges or PBXs.

In accordance with a typical implementation of the network 10, calling party 12 wishes to set up a call to called party 26 over the IP network 18, rather than a TDM network such as PSTN 28. If the call were to be routed via PSTN 28 rather than IP network 18, calling party 12 (or even possibly called party 26) would be required to pay long distance charges that would not be levied by IP network 18.

In such a scenario, calling party 12 would dial the DN of called party 26 (in this case, 613-555-5553), requesting that originating TDM switch 14 set up an IP routing through IP network 18, rather than PSTN 28. Originating TDM switch 14 then contacts originating IP gateway 16 and requests the set up of an IP call. The function of originating IP gateway 16 is to perform the necessary translations of addressing and routing information between originating TDM switch 14 and IP network 18 and vice versa for the call to reach its intended destination.

Originating IP gateway 16 cannot forward the DN of the called party to IP network 18, as IP network requires an IP address for called party 26 to set up a connection. Called party 26 is assigned no such IP address, since it is not an element of IP network 18. To complete the call, originating IP gateway 16 therefore requires the IP address of terminating IP gateway 22, which, upon call connection, will be responsible for completing the call to called party 26.

In most cases, originating IP gateway 16 would not store a database entry for terminating IP gateway 22 (the IP gateway offering gateway services to called party 26). This is because it would be prohibitively expensive for originating IP gateway 16 to maintain the necessary storage capacity to retain database records for all IP gateways in the network. Therefore, a centralized DN/IP database 20 connected to IP network 18 is typically used to perform most DN/IP address resolutions.

In this case, originating IP gateway 16 would set up a connection to DN/IP address database 20 through IP network 18 and request the IP address for terminating IP gateway 22. DN/IP address database 20 would check its database records for the terminating IP gateway that corresponds to DN 613-555-5555, and would return IP address 47.208.22.33 across IP network 18. Originating IP gateway 16 would receive this IP address and use it to establish an IP connection to terminating IP gateway 22 across IP network 18. Terminating IP gateway 22 then establishes a PSTN call to terminating TDM switch 24, which completes the connection by establishing a connection to called party 26.

Due to the number of IP gateways in service around the world, the use of a DN to IP address lookup table at originating IP gateway 16, or the use a centralized DN/IP address database 20 are not viable for most large-scale IP networks such as the Internet.

An alternative solution provided by the present invention is to retrieve the IP address of the terminating IP gateway 22 over a TDM network before the call is initiated over IP network 18. By using existing TDM protocols and infrastructure to request and retrieve IP gateway information, the present invention does not suffer from the scalability problems inherent in other DN/IP address resolution solutions. The present invention does not require additional infrastructure to existing IP networks. Instead, it takes advantage of existing TDM infrastructure without the need for additional hardware or third party services.

Figure 2:
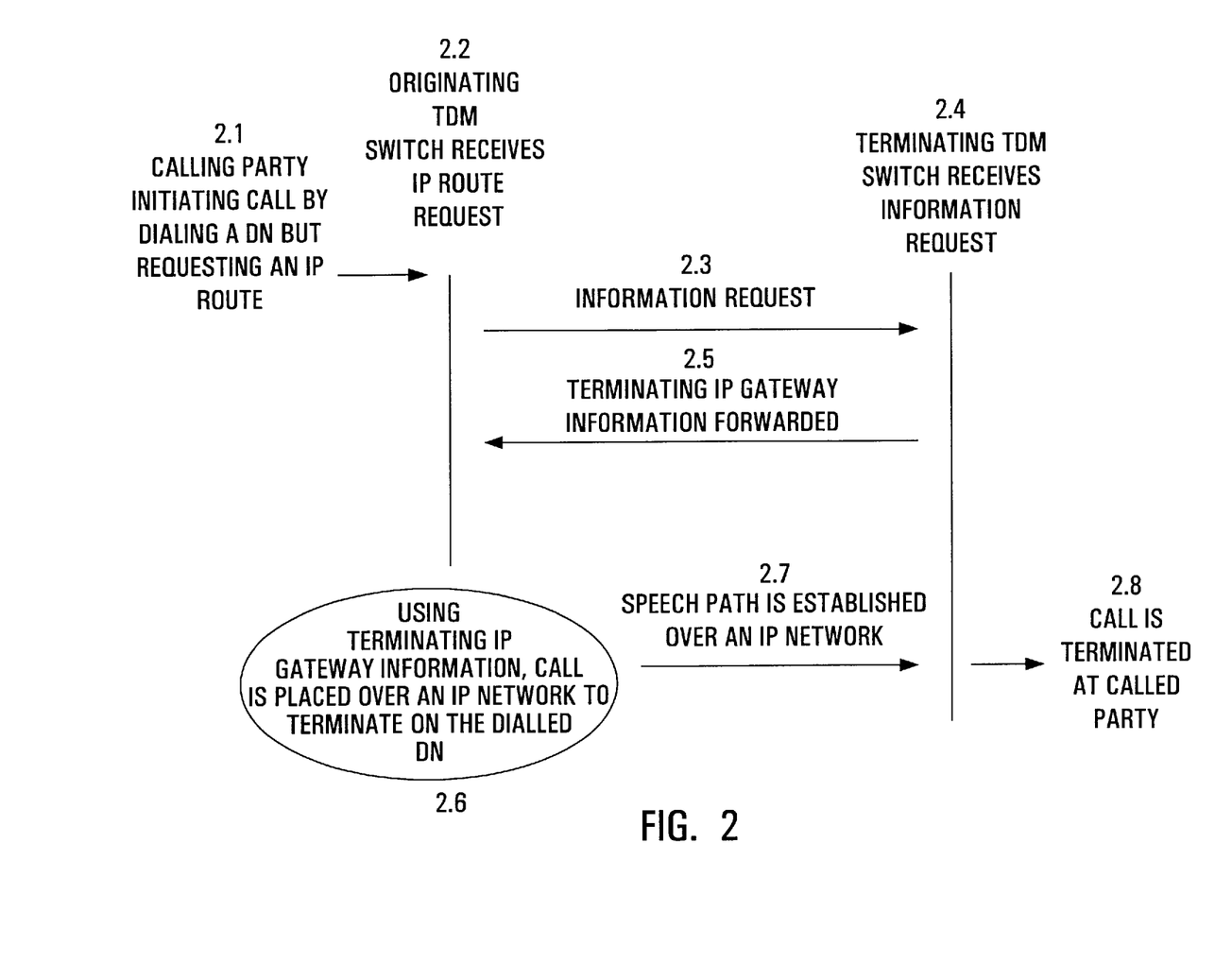
FIG. 2 is a flow diagram of the steps taken to set up a voice over IP call in accordance with one aspect of the present invention.

FIG. 2 is a flow diagram of the steps taken to set up an IP network call in accordance with one aspect of the present invention. Numeric references are to the network elements illustrated in FIG. 1.

At step 2.1, calling party 12 initiates a call by dialling the DN of called party 26, but requesting an IP routing for the call. At step 2.2, originating TDM switch 14 receives DN of called party and the IP call request. Originating TDM switch 14 uses the called party DN to formulate a message containing a request for IP address information. At step 2.3, this message is sent to the terminating TDM switch 24 over PSTN 28. At step 2.4, terminating TDM switch 24 receives the IP address information request and the DN of called party 26.

Stored at terminating TDM switch 24 is a database table containing the IP address of any IP gateway that services its local area, including the IP address of IP gateway 22 which services called party 24. Terminating TDM switch 24 then uses the aforementioned database to resolve the DN of called party 26 with the IP address of terminating IP gateway 22. At step 2.5, terminating TDM switch 24 forwards the IP address of terminating IP gateway 22 over PSTN 28 to originating TDM switch 14. At step 2.6, originating TDM switch 14 forwards the IP address of terminating IP gateway 22 to originating IP gateway 16 where it is used to establish a connection across IP network 18 to terminating IP gateway 22.

At step 2.7, a speech path is established across IP network 18. At step 2.8, terminating IP gateway 22 completes the call to called party 26.

To implement the present invention, a capability must exist at an originating TDM switch to create an information request for IP gateway information that can be forwarded across a TDM network. A TDM network protocol must also exist to transmit the information request across the TDM network, through intermediate transit switches, to a terminating TDM switch where the required IP gateway information is stored. The terminating TDM switch must be capable of performing the necessary DN/IP address resolution, and be capable of transmitting the IP gateway information back through the TDM network to the originating TDM switch. Though not essential to the operation of the present invention, a network protocol used to implement the present invention should allow for the transmission of information request messages and IP gateway information through intermediate transit TDM switches, whether or not such transit switches can support the IP gateway service in the same manner as the originating TDM switch and the terminating TDM switch.

In one embodiment of the present invention, the QSIG and QVPN (QSIG Virtual Private Network) signalling protocols are used to request and retrieve IP gateway information across a TDM network between an originating TDM switch, a terminating TDM switch, and any necessary TDM transit switches between the end switches. QSIG is a signalling system protocol used between interconnected Private Integrated Services Network Exchanges in a Private Integrated Services Network. QVPN is used to implement the service of the present invention between public TDM switches.

The flexibility of QSIG and QVPN to implement this embodiment of the present invention is demonstrated by their inter-operability independent of network topology. In particular, this embodiment takes advantage of QSIG/QVPN feature transparency. When a network node provides a particular service to users, then that node must understand the specific part of the protocol needed to handle the service. However, not all intermediate nodes in a network will necessarily offer the same set of services. When a transit TDM switch set up for the QSIG/QVPN signalling protocols does not provide a particular service, it simply transfers the information to the next node in the network. QSIG/QVPN is structured and organized to adapt to service levels offered by different systems and they allow each network node to provide only the required level of service. A QSIG/QVPN network can exchange high-level services between nodes with lower service levels.

Network manufacturers supporting QSIG/QVPN are free to develop custom, innovative features for particular customers and/or markets. A special mechanism within QSIG is Generic Functional Procedures (QSIG GF) which provides a standardized method of transporting non-standard features (ANFs) by allowing end-to-end communication through the network, whatever its structure. The present invention is one such ANF that could be transported across a TDM network using QSIG/QVPN.

Figure 3:
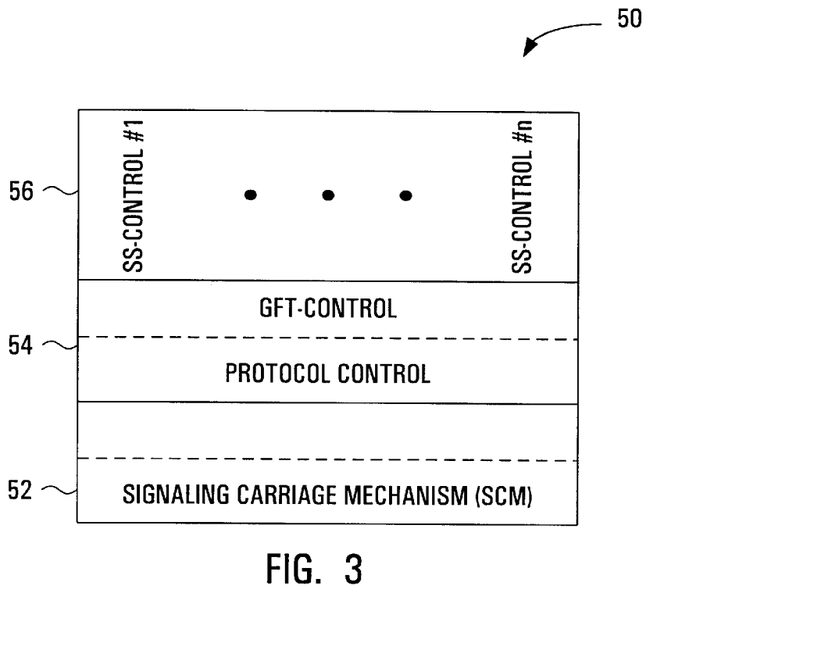
FIG. 3 is a block diagram of a QSIG protocol stack.

FIG. 3 is a block diagram of a QSIG protocol stack 50. The QSIG protocol consists of three layers. The first, Basic Call (BC) 52 contains all the information flows required to set up and take down a call, but no more. The second layer, the Generic Functional protocol (GF) 54, defines additional flows which can carry the service parameters. Finally, the Supplementary Services (SSs) and Additional Network Features (ANFs) 56 define the service parameters to be carried in the BC 52 and GF 54 information flows. This embodiment of the present invention will utilize an ANF to request and retrieve the required IP gateway information between an originating TDM switch and a terminating TDM switch.

Figure 4:
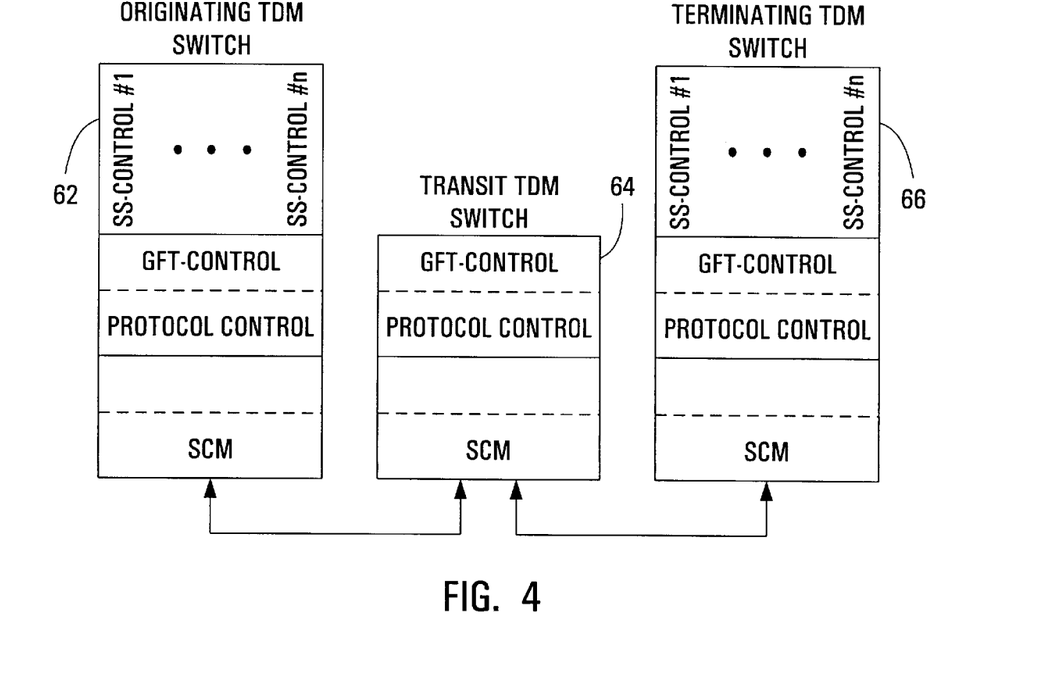
FIG. 4 is a block diagram illustrating an application of the QSIG protocol model to a TDM network.

FIG. 4 is a block diagram of an application of the QSIG protocol model to a network having an originating TDM switch 62, transit TDM switch 64 and terminating TDM switch 66. As shown in this figure, transit TDM switch functionality only requires the support of the BC and GF protocols. The support of the GF protocol provides transparent support of the SSs/ANFs, including the ANF of this embodiment of the present invention, across the network from originating TDM switch to terminating TDM switch.

This embodiment of the present invention utilizes QSIG/QVPN to set up a non-bearer related connection oriented call between an originating switch and a terminating switch. A non-bearer related connection oriented call allows the originating and terminating switches to establish a signalling connection between them without a corresponding B-channel (i.e. no bearer channel is used for information transfer). The two switches are only connected via the signalling network. QSIG non-bearer related call information can be transported over the public network using TCAP/SCCP framework.

By introducing a new QSIG ANF to support the transportation of IP gateway information, a TDM network can provide the address resolution functionality of the IP gateway. This will eliminate a dependency on the services of an external IP address/DN database, such as that illustrated in FIG. 1.

Figure 5:
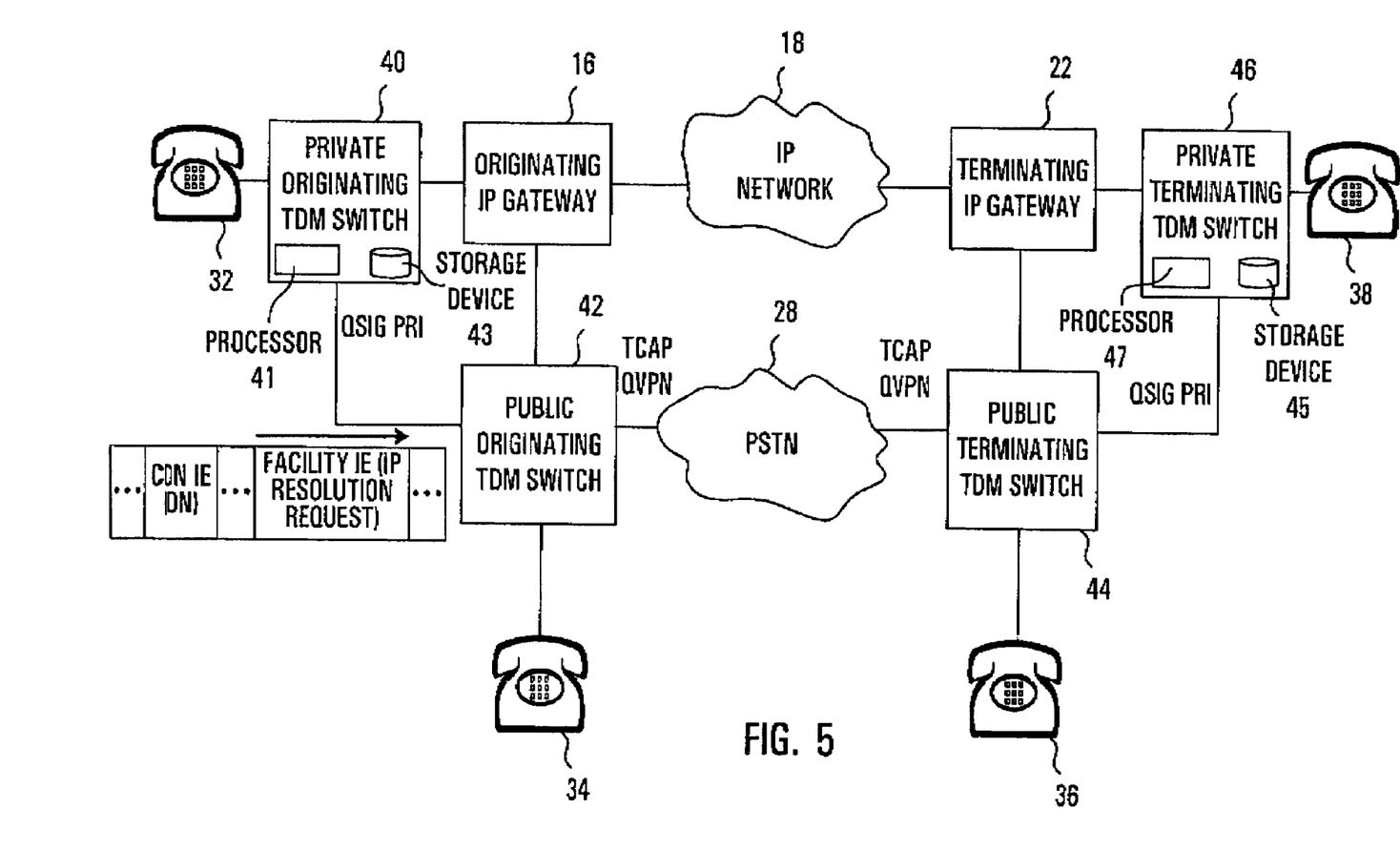
FIG. 5 is a block diagram of a network used to establish voice over IP telecommunications in accordance with one embodiment of the present invention.

FIG. 5 is a block diagram of a network used to establish voice over IP telecommunications in accordance with a QSIG/QVPN embodiment of the present invention. In this embodiment, the QSIG PRI messaging protocol is used to transport the necessary information requests and messages in a private network (represented in the figure by private originating TDM switch 40 and private terminating TDM switch 46), while TCAP QVPN is used for the public network (represented by public originating TDM switch 42, PSTN 28 and public terminating TDM switch 44).

In FIG. 5, private exchange telephone 32 is connected to private originating TDM switch 40, which is connected to both an originating IP gateway 16 and a public originating TDM switch 42. In addition, public originating TDM switch 42 is also connected to originating IP gateway 16, PSTN 28, and public exchange telephone 34. Originating IP gateway 16 is also connected to IP network 18.

PSTN 28 is connected to a public terminating TDM switch 44, which is connected to a private terminating TDM switch 46, a terminating IP gateway 22, and a public exchange telephone 36. Private terminating TDM switch 46 is connected to terminating IP gateway 22 and private exchange telephone 38.

Each of switches 40, 42, 44 and 46 is a conventional TDM switch. For the sake of clarity, only processors 41 and 47, and storage device 43 and 45 are illustrated, though each of the aforesaid switches contains these elements.

As illustrated, interworking between private and public networks is also possible. This would allow, for example, an originating TDM switch in a private network (such as switch 40) to request a far-end IP address of an IP gateway from a terminating TDM switch on a public network (such as switch 44). For simplicity a direct connection from private originating TDM switch 40 to private terminating TDM switch 46 is not shown. Of course, interworking with the public network is not necessary to establish a call from private exchange telephone 32 to private exchange telephone 38.

A QSIG/QVPN embodiment of the present invention can be implemented in many ways. There are a number of sets of messaging which could be used within QSIG/QVPN to provide the required functionality. The typical steps involved in the QSIG/QVPN implementation of the present invention are described as follows:

Step 1: A user employing private exchange telephone 32 ("calling party") outpulses the digits for private exchange telephone 38 ("called party") to private originating TDM switch 40.

At this stage, private originating TDM switch 40 searches its internal cache (DNIPCACHE) to determine if an IP mapping for the called party DN has been registered locally. If so, the stored IP address can be used to directly make a call over IP network 18. If the called party DN is not stored in the DNIPCACHE in storage device 43, then an information request will have to be sent over the network to locate the corresponding IP gateway IP address for that DN.

Step 2: Build information request. Private originating TDM switch 40 sends a QSIG SETUP message to public originating TDM switch 42 (which in this case acts like a tandem switch shown in FIG. 4). The digits for the called party are stored in the Called Directory Number (CDN) Information Element (IE) of the QSIG message for routing to public terminating TDM switch 44 (also operating as a tandem switch). The facility IE of the QSIG message contains an IP resolution request.

Step 3: Tandem of request through network. Public originating TDM switch 42 sends a TCAP QVPN SETUP.Invoke message to public terminating TDM switch 44. The address of public terminating switch 44 would be stored in the Public Called Party Number field of the QVPN message, and an encapsulated IP resolution request would be stored in a VPN Transport Parameter of the QVPN message.

Note that during tandeming, each tandem switch operating between public originating TDM switch 42 and public terminating TDM switch 44 will check whether the message is destined for it by examining the called party DN. If the address does not match its allocation of DNs, it will pass the message on to the next node.

Step 4: The TCAP QVPN SETUP.Invoke message with the IP resolution request is received at private terminating TDM switch 46.

Step 5: Receipt of information request by private terminating TDM switch 46. Private terminating TDM switch 46 invokes service of the present invention by matching the called party DN against a local database table. This table is manually provisioned with all the Internet Gateways that are subtending the private terminating TDM switch 46. When the service is invoked, a simple lookup of this table will provide the requested Internet Gateway IP address, which in this case is the IP address of terminating IP gateway 22.

Step 6: Tandeming IP information back through the network. A successful return result (incorporating the requested Internet Gateway IP address) is tandemed back through the public network to private originating TDM switch 40 by means of the following steps:

Step 6.1: Private terminating TDM switch 46 sends back QSIG Release to public terminating TDM switch 44, with the facility IE containing the IP address of terminating IP gateway 22.

Step 6.2: Public terminating switch TDM 44 sends back TCAP release to public originating switch TDM switch 42, with the encapsulated result of the query, being the IP address of terminating IP gateway 22.

Step 6.3: QSIG release is sent back to private originating TDM switch 40, the facility IE containing the IP address of terminating IP gateway 22.

Step 7: Receipt of IP gateway information by originating TDM switch. If the request for information was successful, the IP address of the IP gateway will be retrieved by the originating TDM switch from the TDM network. That IP address will then be forwarded to IP network 18 to establish a connection between the originating switch (either private exchange 40 or public exchange 42) and terminating IP gateway 22.

optionally, the called party DN and its associated IP address can now be stored in a cache table (DNIPCACHE) at storage device 43 in private originating TDM switch 40. Subsequently, if a call attempt is made to the same DN, the IP address of terminating IP gateway 22 can be retrieved from the cache. For subsequent calls, an additional QSIG/QVPN call will then not be necessary. The DNIPCACHE cache table can be implemented and engineered for maximum efficiency. For example infrequently used DN/IP addresses can be purged at pre-determined intervals. This will keep the cache table down to a manageable size for maximum efficiency.

The IP gateway information request may not have been successful for many reasons (e.g. encountering of non-QSIG type agents, destination address does not support the proposed service, etc.) In these cases, the user can be informed so that they have the choice of re-making the call over the PSTN.

Though not essential, it is desirable that the embodiment employed to locate the IP address of the terminating IP gateway meet the following criteria: (i) fast query time, (ii) low bandwidth burden imposed on the network, and (iii) automatic population of IP gateway information at end nodes.

Though not explained in detail, similar steps would be undertaken to perform an IP resolution for a call between public exchange telephone 34 and public exchange telephone 36, with the exception that only TCAP QVPN messaging would be used to perform the tandem the IP gateway information across the TDM network. Of course, similar steps would also be undertaken for calls between the public network and the private network, such as between public exchange telephone 34 and private exchange telephone 38.

The above description of a preferred embodiment should not be interpreted in any limiting manner since variations and refinements can be made without departing from the spirit of the invention. The scope of the invention is defined by the appended claims and their equivalents.

I claim:

1. A method for performing a Directory Number (DN) to Internet Protocol (IP) address resolution for an IP gateway comprising the steps of:
   i. building a QSIG message containing a DN of a called party at an originating Time-Division Multiplex (TDM) switch;
   ii. forwarding said QSIG message across a TDM network to a terminating TDM switch;
   iii. retrieving from said terminating TDM switch an IP address of an IP gateway; and
   iv. forwarding said IP address of said IP gateway across said TDM network to said originating TDM switch.

2. The method of claim 1 further comprising using said IP address of said IP gateway to establish a call across an IP network.

3. The method of claim 2 wherein if any of i. to iv. is unsuccessful, a message is forwarded to the user advising that the call cannot be made over the IP network, but can be made directly over the Public Switched Telephone Network (PSTN).

4. The method of claim 1 further comprising a user outpulsing the DN of the called party to the originating TDM switch.

5. The method of claim 1 further comprising searching, at said originating TDM switch, for the IP address of said IP gateway, and only proceeding to i. through iv. if no IP address is found.

6. The method of claim 1 further comprising storing said IP address of said IP gateway at said originating TDM switch.

7. The method of claim 1 wherein the step of building a QSIG message containing a DN of a called party at an originating TDM switch includes the steps of:
  i. storing the DN in a Called Directory Number (CDN) Information Element (IE) of the QSIG message; and
  ii. storing an IP resolution request in a facility IE of the QSIG message.

8. The method of claim 7 further comprising sending a TCAP QVPN SETUP.Invoke message to a tandem TDM switch.

9. The method of claim 1 wherein the step of forwarding said QSIG message across a TDM network to a terminating TDM switch includes the steps of:
  i. forwarding said QSIG message to a tandem TDM switch;
  ii. verifying at said tandem TDM switch whether the DN of the called party matches a pre-defined allocation of directory numbers of said tandem switch;
  iii. forwarding said QSIG message to said terminating TDM switch if the DN of the called party does not match a pre-defined allocation of directory numbers.

10. The method of claim 1 wherein retrieving from said terminating TDM switch an IP address of an IP gateway includes:
  i. searching a database table containing the IP addresses of any IP Gateways subtending the terminating TDM switch;
  ii. retrieving from said database table the IP address of an IP gateway offering IP services to the DN of the called party.

11. The method of claim 1 wherein forwarding said IP address of said IP gateway across said TDM network to said originating TDM switch includes:
  i. forwarding a QSIG Release message containing the IP address of said IP gateway to a tandem TDM switch;
  ii. forwarding a TCAP release message containing the IP address of said IP gateway; and
  iii. receiving at said originating TDM switch a QSIG Release message containing the IP address of said IP gateway.

12. In an originating Time-Division Multiplex (TDM) switch, a method of performing a Directory Number (DN) to Internet Protocol (IP) address resolution for an IP gateway comprising the steps of:
  i. receiving a DN of a called party;
  ii. building a QSIG message containing said DN;
  iii. forwarding said QSIG message across a TDM network to a terminating TDM switch; and
  iv. retrieving from said TDM network an IP address of an IP gateway.

13. The method of claim 12 further comprising using said IP address of said IP gateway to establish a call across an IP network.

14. The method of claim 12 further comprising a user outpulsing the DN of the called party to the originating TDM switch.

15. The method of claim 14 wherein if any of i. to iv. is unsuccessful, a message is forwarded to the user advising that the call cannot be made over the IP network, but can be made directly over the Public Switched Telephone Network (PSTN).

16. The method of claim 12 further comprising searching, at said originating TDM switch, for the IP address of said IP gateway, and only proceeding to ii. through iv. if no IP address is found.

17. The method of claim 12 further comprising storing said IP address of said IP gateway at said originating TDM switch.

18. The method of claim 12 wherein the step of building a QSIG message containing said DN includes the steps of:
  i. storing the DN in a Called Directory Number (CDN) Information Element (IE) of the QSIG message; and
  ii. storing an IP resolution request in a facility IE of the QSIG message.

19. The method of claim 18 further including sending a TCAP QVPN SETUP.Invoke message to a tandem TDM switch.

20. The method of claim 12 wherein the step of forwarding said QSIG message across a TDM network to a terminating TDM switch includes the steps of:
  i. forwarding said QSIG message to a tandem TDM switch;
  ii. verifying at said tandem TDM switch whether the DN of the called party matches a pre-defined allocation of directory numbers;
  iii. forwarding said QSIG message to said terminating TDM switch if the DN of the called party does not match a pre-defined allocation of directory numbers.

21. In a terminating Time-Division Multiplex (TDM) switch, a method for performing a Directory Number (DN) to Internet Protocol (IP) address resolution for an IP gateway comprising the steps of:
  i. receiving from a TDM network a QSIG message containing a DN of a called party;
  ii. retrieving an IP address of an IP gateway; and
  iii. forwarding said IP address of said IP gateway to said TDM network.

22. The method of claim 21 wherein retrieving an IP address of an IP gateway includes:
  i. searching a database table containing the IP addresses of any IP Gateways subtending the terminating TDM switch;
  ii. retrieving from said database table the IP address of an IP gateway offering IP services to the DN of the called party.

23. The method of claim 21 wherein forwarding said IP address of said IP gateway to said TDM network includes the step of forwarding a QSIG Release message containing the IP address of said IP gateway to a tandem TDM switch.

24. An originating Time-Division Multiplex (TDM) switch comprising:
  a first communications link connecting said originating TDM switch to a TDM network;
  a second communications link connecting said originating TDM switch to an IP network;
  a processor for: (i) building a QSIG message containing a Directory Number (DN) of a called party, (ii) forwarding said QSIG message to said first communications link where it will be transmitted across said TDM network to a terminating TDM switch, (iii) receiving from said first communications link an IP address of an IP gateway, and (iv) forwarding said IP address to said second communications link to establish a call over said IP network.

25. The originating TDM switch of claim 24 further including a storage device for storing an IP address of an IP gateway.

26. A terminating Time-Division Multiplex (TDM) switch comprising:

a communications link connecting said terminating TDM switch to a TDM network;

a storage device for storing an IP address of an IP gateway subtending said terminating TDM switch;

a processor for: (i) receiving a QSIG message containing a Directory Number (DN) of a called party from an originating TDM switch, (ii) searching said storage device for said IP address of said IP gateway, and (iii) forwarding said IP address to said communications link where said IP address will be transmitted across said TDM network to an originating TDM switch.

\* \* \* \* \*